(12) United States Patent
Cotichini (10) Patent No.: US 8,831,964 B2
(45) Date of Patent: Sep. 9, 2014

(54) LEGACY SOFTWARE MULTIMEDIA CAPTURE AND ANALYSIS

(75) Inventor: Christian Cotichini, Vancouver (CA)

(73) Assignee: MAKE Technologies, Inc., Vancouver (CA)

(*) Notice: Subject to any disclaimer, the term of this patent is extended or adjusted under 35 U.S.C. 154(b) by 1846 days.

(21) Appl. No.: 11/682,273

(22) Filed: Mar. 5, 2007

(65) Prior Publication Data

US 2007/0208767 A1    Sep. 6, 2007

Related U.S. Application Data

(60) Provisional application No. 60/779,178, filed on Mar. 3, 2006.

(51) Int. Cl.
| | | |
|---|---|---|
| *G06Q 10/00* | (2012.01) | |
| *G06F 17/30* | (2006.01) | |
| *G11B 27/10* | (2006.01) | |
| *G06Q 10/10* | (2012.01) | |
| *G11B 27/034* | (2006.01) | |

(52) U.S. Cl.
CPC .... *G06F 17/30044* (2013.01); *G06F 17/30056* (2013.01); *G11B 27/10* (2013.01); *G06Q 10/10* (2013.01); *G11B 27/034* (2013.01); *G06F 17/30047* (2013.01)
USPC ........ 705/7.11; 705/7.27; 707/7.36; 715/704; 725/9

(58) Field of Classification Search
CPC ................... G06F 17/30044; G06F 17/30047; G06F 17/30056
USPC ................ 705/7.11, 7.27; 707/7.36; 715/704; 725/9
See application file for complete search history.

(56) References Cited

U.S. PATENT DOCUMENTS

| | | | |
|---|---|---|---|
| 2002/0040359 A1 | 4/2002 | Green et al. | |
| 2002/0069218 A1* | 6/2002 | Sull et al. | 707/501.1 |
| 2002/0129363 A1* | 9/2002 | McGuire | 725/37 |
| 2003/0025599 A1* | 2/2003 | Monroe | 340/531 |
| 2007/0078876 A1* | 4/2007 | Hayashi et al. | 707/101 |

OTHER PUBLICATIONS

Hilbert, D. M., & Redmiles, D. F. (2000). Extracting Usability Information from User Interface Events, 32(4), 384-421.*
Myra Spiliopoulou; Bamshad Mobasher; Bettina Berendt, Miki Nakagawa. A Framework for the Evaluation of Session Reconstruction Heuristics in Web-usage Analysis. Informs Journal on Computing. Linthicum: Spring 2003. vol. 15, Iss. 2; p. 171.*
Bovenzi, D. et al., "Enabling Legacy System Accessibility by Web Heterogeneous", Proceedings of the 7th European Conference on Software Maintenance and Reengineering, Mar. 26-28, 2003, pp. 73-81.
Canfora, G. et al., "Migrating Interactive Legacy Systems to Web Services", Proceedings of the 10th European Conference on Software Maintenance and Reengineering, Mar. 22-24, 2006, vol. 00, pp. 10pp.
Chiang, C.-C., "Extracting Business Rules From Legacy Systems Into Reusable Components", IEEE/SMC International Conference on System of Systems Engineering, Apr. 24-26, 2006, pp. 6pp.

* cited by examiner

*Primary Examiner* — Timothy Padot
(74) *Attorney, Agent, or Firm* — Winstead PC (57) ABSTRACT

A system of tools and methodologies configured to capture, process, and analyze user interaction through multimedia tagging for the purpose of exposing users' adapted behavior when they are performing their job function with the legacy application is described. The resulting analysis can be applied to the re-engineering process in order to create a new application that is fully functional in a modern context.

18 Claims, 7 Drawing Sheets

LEGACY SOFTWARE MULTIMEDIA CAPTURE AND ANALYSIS

CROSS-REFERENCE TO RELATED APPLICATIONS

This application claims the benefit of U.S. Provisional Application No. 60/779,178, filed on Mar. 3, 2006, and entitled LEGACY SOFTWARE MULTIMEDIA CAPTURE AND ANALYSIS, the disclosure of which is hereby incorporated by reference in its entirety for all purposes.

TECHNICAL FIELD

The present invention relates generally to business systems and software, and more particularly to capturing, processing, and analyzing user interaction with a legacy application.

BACKGROUND

In the past, numerous organizations have employed software systems created and maintained over a period of time much longer than their anticipated lifespan. Typically, during the operating life of a software system, the needs of an organization change faster than the software is updated, causing the software to be antiquated and inefficient. As a result, users are generally forced to adapt their behavior to include coping mechanisms and specialized system management techniques to extend the useful life of the legacy application. Over time, these practices become integrated as standard operating procedures for interacting with the software system.

When the process of modernizing a legacy software system does occur, the adapted behavior of the users becomes critical with regard to making the new software system fully functional. Any attempt to modernize a legacy software system without taking into consideration the adapted behaviors formed by system users can lead to a system that does not meet the current needs of the organization.

Many of the past approaches to legacy software system modernization have lacked comprehensive analysis of system user interaction resulting in flawed software system modernization.

SUMMARY OF THE INVENTION

A system of tools and methodologies configured to capture, process, and analyze user interaction through multimedia tagging for the purpose of exposing users' adapted behavior when they are performing their job function with the legacy application. The resulting analysis can be applied to the re-engineering process in order to create a new application that is fully functional in a modern context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF DRAWINGS

The disclosure is illustrated by way of example and not by way of limitation in the figures of the accompanying drawings, in which the like references indicate similar elements and in which.

DETAILED DESCRIPTION

Figure 1:
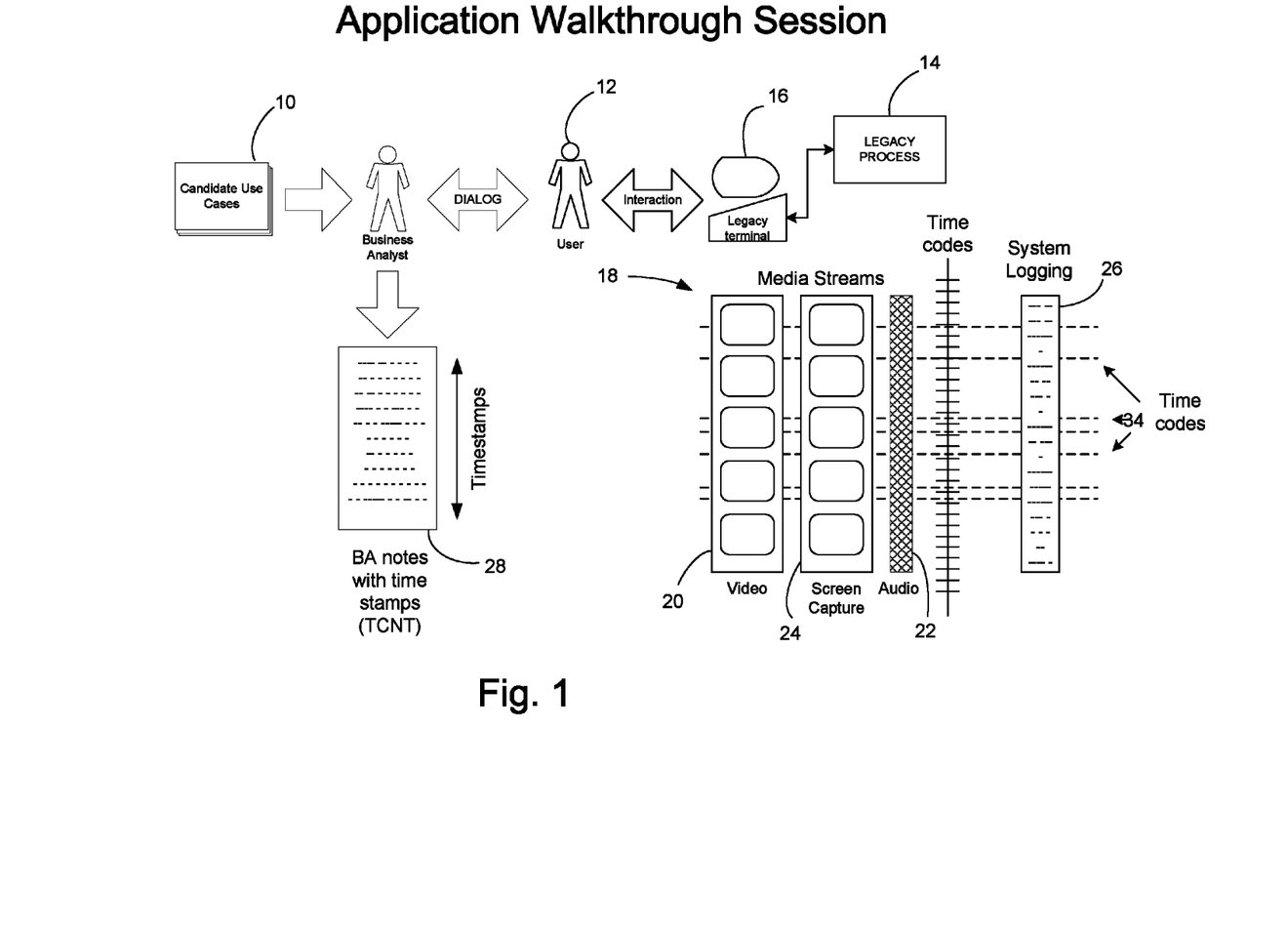
FIG. 1 is a schematic diagram showing a method of capturing user interactions with a legacy application.

FIG. 1 shows an example process wherein user interaction with a legacy application is captured. Before the capture stage begins, user interactions are organized into specific categories which pertain to particular functional areas of the legacy application. As used herein "application" refers to software or firmware components that may be executed by, or utilized by one or more computing devices within an organization, and is meant to encompass executable files, data files, libraries, drivers, scripts, database records, etc. Some examples of functional categories may include human resources, finance, sales, etc.

For each functional category, high-level information is collected in cooperation with capturing user interactions. The information may be in the form of system documentation, screen shots of a system user interface, sample reports, entity relationship (ER) diagrams, or any other related article. Once collected, the information is used to develop specific use cases. Within a use case, a user carries out a process from start to finish; wherein the user may complete multiple tasks while interacting with the legacy application.

The demonstrated use case can reveal many useful characteristics of the legacy application, such as the practices of a user, a user's understanding of the system, how a particular system interface functions, what system programs are invoked for a particular use case, what outcomes occur as a result of the completed use case, etc.

Figure 2:
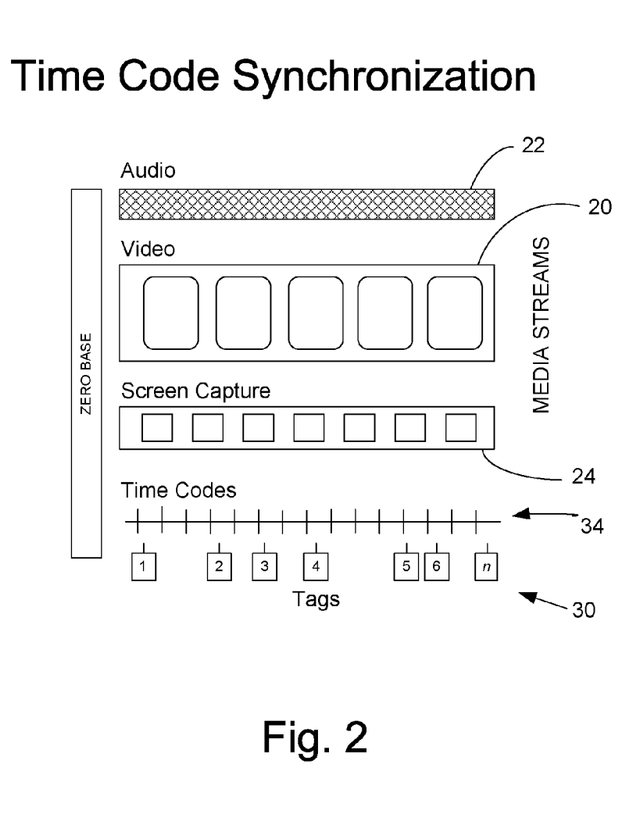
FIG. 2 is a schematic diagram showing how captured user interactions are processed and organized.

Referring to FIGS. 1 and 2, an example demonstration of a user's interaction with a legacy application is based on a specific use case 10, wherein a user 12 carries out a legacy process 14 via a legacy terminal 16. Concurrent to the demonstration, various media streams 18 capture multiple aspects of the user's interaction with the legacy application.

Video media stream 20 captures the physical actions of the user as they perform a task. Audio media stream 22 captures narrative dialog of the user pertaining to instructional information about the nature of what they are doing and personal understanding of the significance of each step performed. Screen capture media stream 24 captures system activity of the legacy application, for example, interaction with a graphic user interface, completion of a text field, or a search performed. System logging tool 26 captures software activity of the legacy application, for example, objects created or used, system branches, or read/write calls.

During the capture stage, time coded note-taking tool (TCNT) 28 is configured to enhance captured multimedia with information pertaining to the contents of the multimedia. In addition, the time coded note-taking tool marks streams of the captured multimedia with reference tags 30. The tags facilitate linking of content under specific references, described in more detail below. Example reference tags include, screen, menu, concept, event, actor, system interface, etc.

After the capture stage is completed, generated multimedia is processed, wherein each multimedia stream is converted into a data format suitable for playback and linking. As part of the processing stage each media stream is embedded with time codes 34 based on a synchronized clock. The time codes in the various feeds are converted into a zero-based time code so that all feeds can be synchronized. The synchronization of the clocks allows the separate media streams to be linked so that all aspects of a single task can be analyzed simultaneously. In some instances, a time format of HH:MM:SS:FF may be used for enhanced accuracy.

Furthermore, during the processing stage, additional information may be added to the multimedia streams via the time coded note-taking tool. This step may be repeated until all relevant notes are included. When all additional information has been submitted via the time coded note-taking tool, the information can be converted to a general purpose XML format with zero-based time codes so that the information can be accurately tagged to the associated multimedia streams.

Figure 3:
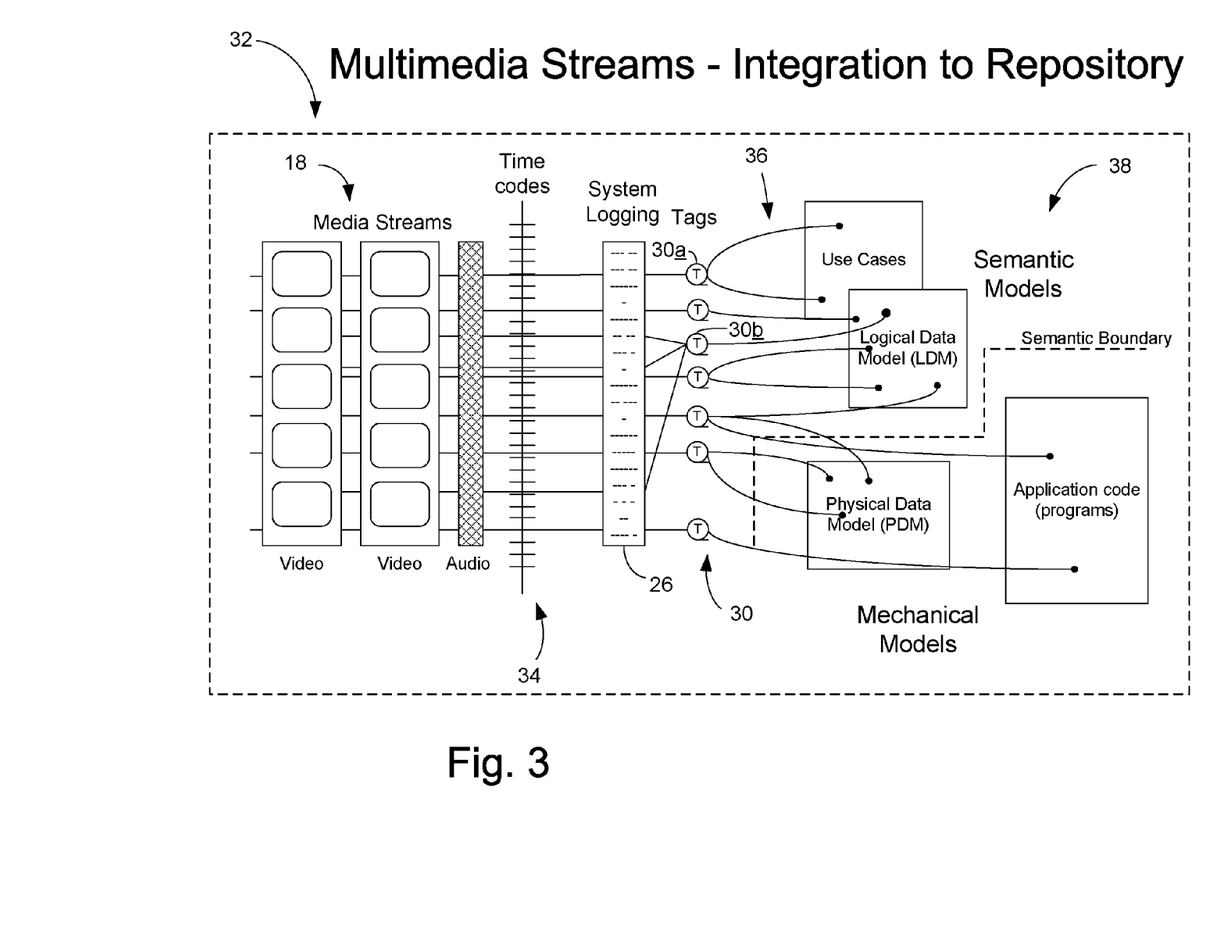
FIG. 3 is a schematic diagram showing how processed multimedia is linked for modeling and analysis.

Referring to FIG. 3, as part of the analysis stage, tagged and processed multimedia streams are loaded into repository 32. Within repository 32, links 36 can be generated between multimedia streams 18 and various time-coded notes either directly or indirectly. A direct link can be made to a specific time code location 34, while an indirect link can be made to reference tag 30 which will link the multimedia stream to any time code associated with the reference tag. One example of a direct link is shown at tag 30*a*, while one example of an indirect link is shown at tag 30*b*. Tag 30*a* is linked only to one time code, while tag 30*b* is linked to a plurality of time codes. It will be understood that these tags include the notes taken during the walkthrough by a business analyst, and also include fields for linking to time codes and elements within the semantic and mechanical models. In some instances, additional qualifier information, such as, for example branch to a specific process, may be included in a tag link for the purpose of filtering searches during analysis.

Once multimedia streams 18 have been tagged, it is then possible to link to models 38 of the legacy software application, which may include semantic and mechanical models as explained below with reference to FIG. 4 and FIG. 5. A model may show the actions of a user at a particular time code and through the links of the model can expose specific information from the legacy application, such as programs invoked to service the action of the user. Furthermore, the generated models make it possible to perform searches within the repository wherein unified results are returned.

Figure 4:
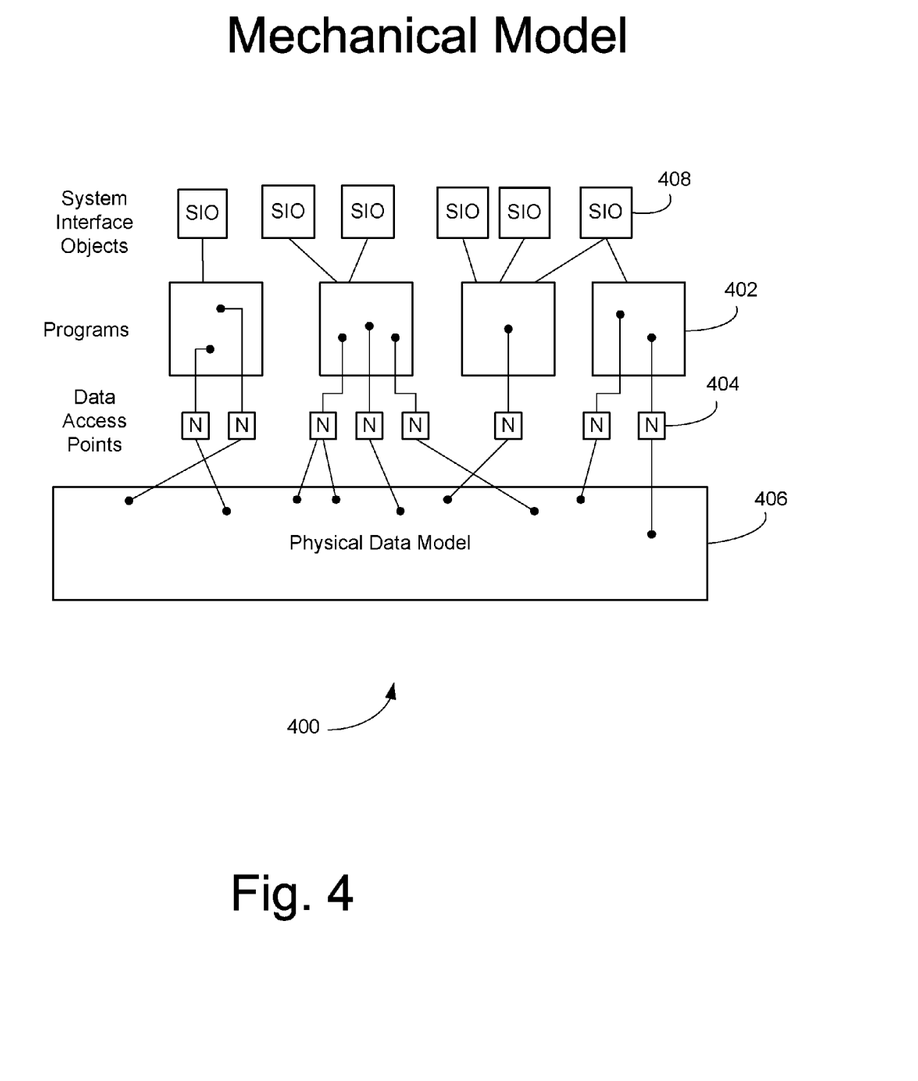
FIG. 4 is a schematic diagram of an exemplary mechanical model.

Now referring to FIG. 4, a mechanical model 400 is illustrated that may be used in the embodiment illustrated in FIG. 3. Mechanical model 400 contains various example programs 402 which can be linked to physical data model 406 via data access points 404. A physical data model can be configured to store data records utilized by the legacy computer application that may be used according to a legacy process 14. Programs 402 may have a plurality of links to physical data model 406 through multiple data access points 404. Programs 402 may also be linked to system interface objects 408.

In some instances multiple programs may produce different portions of a single system interface object. As another example a program may produce a plurality of different system interface objects. Information and relationships related to a particular mechanical asset can be exposed in the mechanical model. The mechanical model and the semantic model can be used in combination to identify assets of a legacy application.

Figure 5:
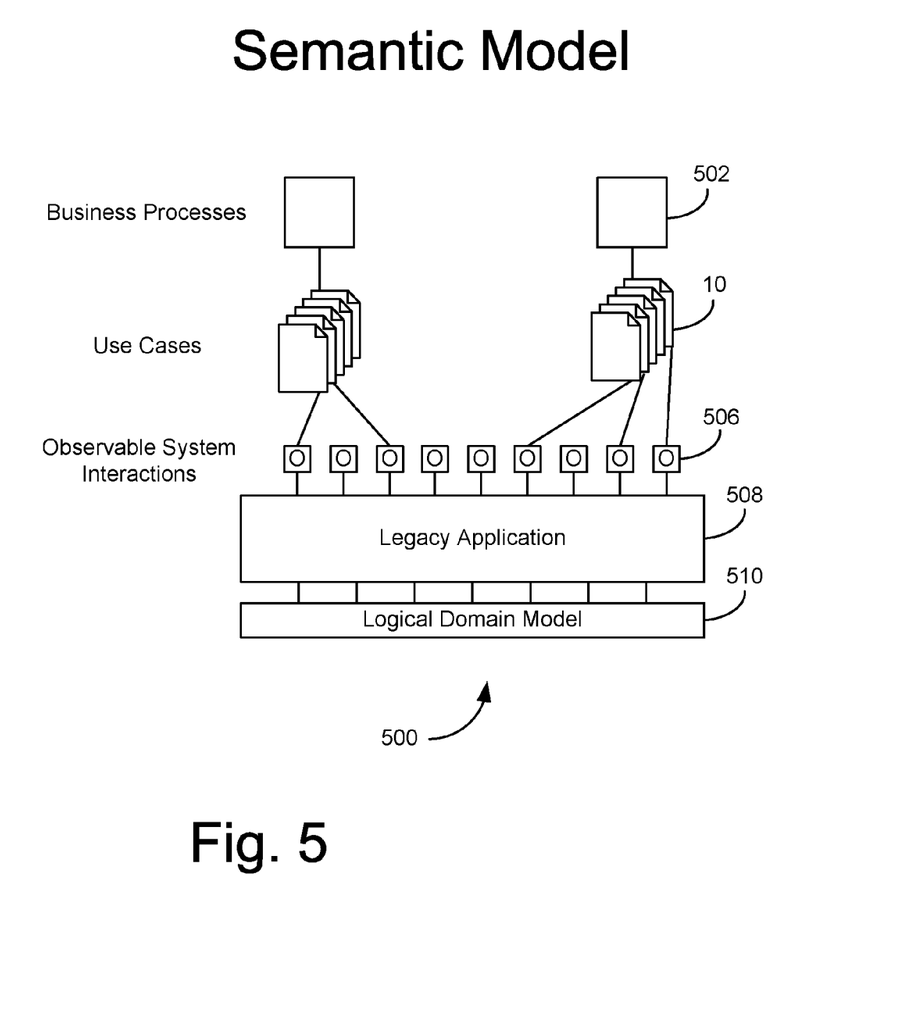
FIG. 5 is a schematic diagram of an exemplary semantic model.

FIG. 5 shows a schematic representation of the semantic model hierarchy. The semantic model 500 can include business processes 502, use cases 10, observable system interactions 506, and domain model 510. Elements of the semantic model can interact with elements of the mechanical model within the legacy application 508, but semantic elements exist independently of the mechanical model.

The semantic model can be formed by identifying any business processes 502 conducted by legacy application 508. For each business process a plurality of use cases 10 may exist. A use case can be a specific set of steps taken to complete a business process. Identified steps of a use case may be extracted in various ways including graphic modeling or video recording. An exemplary video recording may show a user interacting with a screen produced by the legacy application 508. During the semantic asset extraction process some use cases may already be identified while other use cases may have to be created.

Steps of a use case 1 may include observable system interactions 506. An observable system interaction may be any point where a use case employs a mechanical asset of the legacy application 508. An observable system interaction can cross the semantic boundary. One example of an observable system interaction is when a user uses a screen produced by a program of the legacy application 508 to complete a step of a use case.

An observable system interaction may be used to retrieve information embedded in the mechanical model from domain model 510. The domain model can be represented as static elements mapped to dynamic data stored in the physical data model. The elements of the domain model are descriptions which can enable a user to understand and evaluate data in the physical data model. An example element of the domain model may be an invoice number or a customer name or any other description related to a business process.

Once all of the semantic assets are identified, they can be parsed. During a parsing process each asset can be tagged with identifier information which can be used for the purposes of mapping the semantic assets.

After the semantic assets have been parsed and tagged with information, nodes can be assigned to the tagged assets. The nodes can be linked together through modeling which, in turn, can be used to generate maps of the semantic model. When the mapping process is completed, a semantic model of the legacy application 508 is created.

Figure 6:
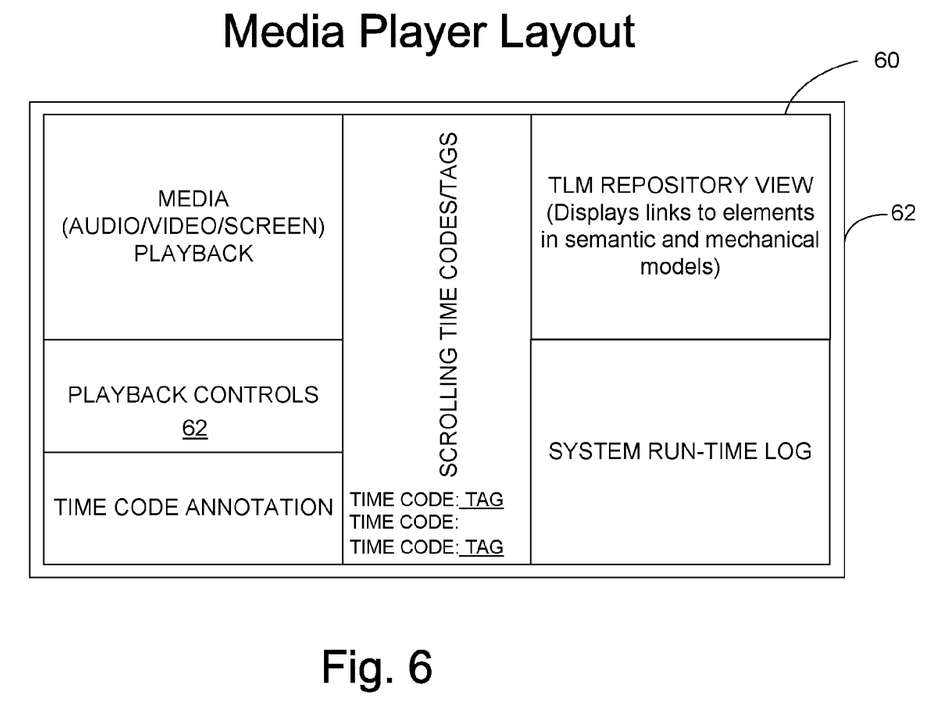
FIG. 6 is a schematic diagram showing the layout of a multimedia analysis tool of the present disclosure.

FIG. 6 illustrates an exemplary embodiment of a multimedia analysis tool 60. In some embodiments multimedia analysis tool may be displayed with a graphical user interface 62 configured to display at least a segment of one of the media streams 18 in a playback window, the segment having a selected time code that is also displayed via the graphical user interface 62. At the center of the window a scrolling list of time codes is displayed, along with tags associated with certain of the time codes. By selecting a tag, the user may call up media, annotations, system log, and links to elements within the legacy software program model associated with the time code. Playback controls 62 are provided to play, fast forward, and rewind through the media stream. The media stream may include video, audio, screen shots, etc., as described herein.

Analysis of a legacy application 508 can be conducted by searching and browsing various multimedia streams displayed on the multimedia analysis tool. When a particular multimedia stream is accessed, information related to the multimedia stream through links to either a time code or a reference tag can be presented.

For example, a multimedia stream of a user generating a report may be selected, wherein the multimedia analysis tool can display the video and audio streams of the user as well as code segment executed during the generation of the report. In this way, the behavior of a legacy application 508 may be analyzed.

Figure 7:
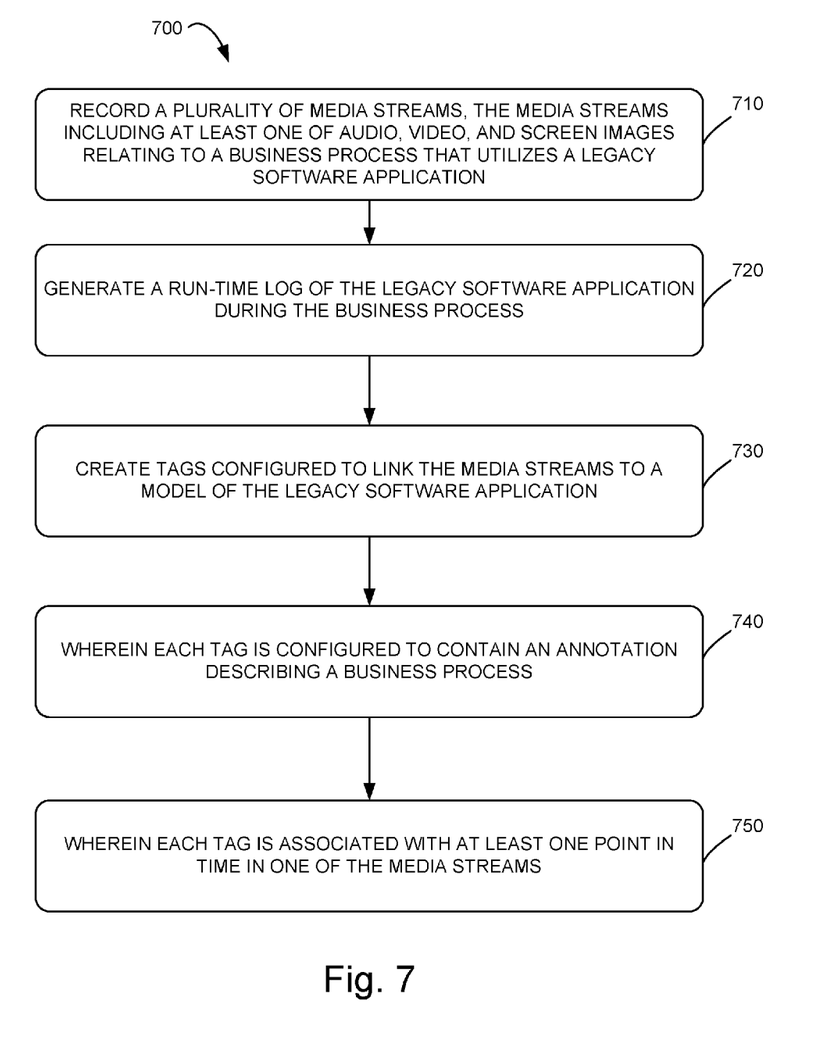
FIG. 7 shows an embodiment of a process flow of a method for legacy software multimedia capture and analysis.

FIG. 7 shows an embodiment of a process flow of a method 700 for legacy software multimedia capture and analysis. At block 710, method 700 records a plurality of media streams, the media streams including at least one of audio, video, and screen images relating to a business process that utilizes a legacy software application. In block 720, method 700 generates a run-time log of the legacy software application during the business process. Method 700 then creates tags configured to link the media streams to a model of the legacy software application, as illustrated in block 730. According to block 740, each tag is configured to contain an annotation describing a business process and in block 750, each tag is associated with at least one point in time in one of the media streams.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding, two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A software modernization method for use by a business analyst, comprising:
    recording, by a computing device, a plurality of media streams, the media streams including at least one of audio, video, and screen images of a user interaction with a legacy software application;
    generating, by the computing device, a run-time log of the legacy software application during the user interaction, the run-time log including software activity of the legacy software application; and
    creating, by the computing device, tags that link the media streams and the run-time log to models of the legacy software application, wherein the models of the legacy software application include a semantic model and a mechanical model, the mechanical model including programs linked to a physical data model via data access points,
    the semantic model identifying as semantic assets a plurality of steps of a use case of a business process according to which a user interacts with the legacy software application, the steps including one or more observable system interactions during which the user interacts with system interface objects of computer-implemented operations of the legacy software application; and
    wherein each tag is associated with at least one point in time in one of the media streams and contains an annotation describing the user interaction at the at least one point in time.

2. The method of claim 1, further comprising:
    displaying via a graphical user interface at least a segment of one of the media streams in a playback window, the segment having a selected time code that is also displayed via the graphical user interface.

3. The method of claim 2, wherein the graphical user interface further is configured to display elements within the models of the legacy software application that are linked to the selected time code via a tag.

4. The method of claim 3, wherein the graphical user interface is further configured to display a portion of the run-time log that is linked to the selected time code via a tag.

5. The method of claim 4, wherein the graphical user interface is further configured to display an annotation associated with the selected time code.

6. The method of claim 1, the method further comprising converting each of the media streams and the run-time log of the legacy software application, and tags associated therewith, to a common time frame of reference.

7. The method of claim 6, wherein converting is accomplished in part by embedding each of the media streams with time codes based on a synchronized clock.

8. The method of claim 7 wherein the time codes are zero-based time codes.

9. The method of claim 1, wherein the physical data model is configured to store data records utilized by the legacy software application during the user interaction.

10. The method of claim 9, wherein the media streams, run-time log tags, and models of the legacy software application are stored in a repository accessible by a computing device.

11. The method of claim 10, wherein the run-time log includes a time code for each time a program is invoked.

12. The method of claim 10, wherein the run-time log further comprises a timestamp for each of a plurality of database queries.

13. The method of claim 10, further comprising using the repository to observe how the legacy software application behaves when a particular code segment is executed.

14. The method of claim 10, further comprising using the repository to view related mechanical assets.

15. The method of claim 10, wherein the computing device is configured to display a graphical user interface including video playback window, playback controls, time code annotations, time codes, and a view of linked elements in the models of the legacy software application, and the run-time log.

16. The method of claim 1, wherein the annotations are assigned to categories which pertain to particular functional areas of the legacy software application.

17. The method of claim 1, further comprising searching the media streams according to at least one tag.

18. The method of claim 1, further comprising converting the annotation to XML format.

* * * * *